(12) United States Patent
Krishnamoorthy et al.

(10) Patent No.: US 8,670,671 B2
(45) Date of Patent: Mar. 11, 2014

(54) ENERGY-EFFICIENT OPTICAL SOURCE

(75) Inventors: Ashok V. Krishnamoorthy, San Diego, CA (US); Xuezhe Zheng, San Diego, CA (US); John E. Cunningham, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 13/361,866

(22) Filed: Jan. 30, 2012

(65) Prior Publication Data

US 2013/0195461 A1    Aug. 1, 2013

(51) Int. Cl.
*H04J 14/00* (2006.01)
*H04J 14/02* (2006.01)

(52) U.S. Cl.
CPC ..................... *H04J 14/02* (2013.01)
USPC ................ 398/91; 398/82; 398/94

(58) Field of Classification Search
USPC .......... 398/37, 38, 45, 68, 81, 82, 91, 94, 164
See application file for complete search history.

(56) References Cited

U.S. PATENT DOCUMENTS

| | | | | |
|---|---|---|---|---|
| 6,693,926 B2 * | 2/2004 | Cayrefourcq et al. | .......... | 372/14 |
| 7,106,774 B2 * | 9/2006 | Fisher | .......... | 372/46.01 |
| 7,228,071 B2 * | 6/2007 | Park et al. | .......... | 398/49 |
| 7,720,378 B2 * | 5/2010 | Aoki | .......... | 398/47 |
| 7,791,793 B2 * | 9/2010 | Noguchi et al. | .......... | 359/344 |
| 7,885,492 B2 * | 2/2011 | Welch et al. | .......... | 385/14 |
| 8,170,416 B2 * | 5/2012 | Kai et al. | .......... | 398/45 |
| 8,204,385 B2 | 6/2012 | Zheng et al. | | |
| 2007/0101927 A1 * | 5/2007 | Keyser et al. | .......... | 117/20 |
| 2010/0109052 A1 * | 5/2010 | Nakajima et al. | .......... | 257/197 |

OTHER PUBLICATIONS

Fang, A.W. et al. "A distributed Bragg reflector silicon evanescent laser," IEEE Photonics Technol. Lett., 2008, 20, pp. 1667-1669.
Sanjoh, H. et al. "Multiwavelength light source with precise frequency spacing using a mode-locked semiconductor laser and an arrayed waveguide grating filter," IEEE Photon. Technol. Lett, 9 (6), 818-820, 1997.
Delfyett, P. J. et al. "Optical frequency combs from semiconductor lasers and applications in ultrawideband signal processing and communications," J. Lightwave Technol., 24 (7) 2701-2719, 2006.
Scott, R. P. et al., "3.5-THz wide, 175 mode optical comb source," OFC/NFOEC, OWJ3, pp. 1-3, (2007).

(Continued)

*Primary Examiner* — Dalzid Singh
(74) *Attorney, Agent, or Firm* — Park, Vaughan, Fleming & Dowler LLP; Steven E. Stupp

(57) ABSTRACT

An optical source includes a set of N light sources that provide a corresponding set of N optical signals having N carrier wavelengths. These optical signals are combined into a seed optical signal and transported to a substrate using an optical fiber. This substrate includes a set of K optical amplifiers that amplify the seed optical signal and provide a set of M output optical signals on a corresponding set of M output optical waveguides (where M is less than K). In this way, a total power of the set of M output optical signals may be significantly larger than that of the seed optical signal, thereby ensuring that a majority of a power efficiency of the optical source is associated with power efficiencies of the set of K optical amplifiers instead of power efficiencies of the set of N light sources.

20 Claims, 8 Drawing Sheets

(56) References Cited

OTHER PUBLICATIONS

Kovsh, A. et al. "Quantum dot laser with 75nm broad spectrum of emission," Opt. Lett., 32, 793, 2007.

Wojcik, Gregory L. "A single comb laser source for short reach WDM interconnects", Proceedings of the SPIE, vol. 7230, pp. 72300M-72300M-12 (2009).

Liu, Jifeng et al. "Ge-on-Si laser operating at room temperature", Opt. Lett., 35(5) 679-681, (2010).

* cited by examiner

ENERGY-EFFICIENT OPTICAL SOURCE

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure relates to techniques for communicating optical signals. More specifically, the present disclosure relates to an optical source for a set of optical signals that includes a set of semiconductor-optical amplifiers (SOAs) whose power consumption dominates the total power consumption of the optical source.

2. Related Art

Silicon photonics is a promising technology that can provide large communication bandwidth, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photodetectors. However, a suitable low-cost WDM optical source, such as a multi-wavelength laser source, remains a challenge and poses an obstacle to implementing WDM silicon-photonic links.

For example, existing WDM lasers (such as those used to transmit optical signals in WDM telecommunications systems) are usually very expensive, transmit a single wavelength and typically have high power consumption (on the order of a few percent of wall-plug efficiency, which is defined as the coupled-out laser power divided by the total consumed electrical power). Because future WDM silicon-photonic links are expected to include thousands of optical channels (or more), which each consume around 1 mW of optical power, the power consumption, size and cost of the WDM laser sources is likely to be prohibitive and may offset the advantages of WDM silicon-photonic links.

Hence, what is needed is an optical source without the above-described problems.

SUMMARY

One embodiment of the present disclosure provides an optical source that includes a set of N light sources that provide a corresponding set of N optical signals having N carrier wavelengths, where a given light source provides a given optical signal having a given carrier wavelength. Moreover, the optical source includes an optical combiner that combines the set of N optical signals into a seed optical signal, and an optical fiber that transports the seed optical signal. Furthermore, a substrate in the optical source includes: an optical coupler optically coupled to the optical fiber; an optical waveguide, disposed on a surface of the substrate, which transports the seed optical signal; a set of K optical amplifiers that amplify the seed optical signal and provide a set of M output optical signals; and a set of M output optical waveguides (where M is less than K), where a given output optical waveguide transports a given output optical signal. Note that the given output optical signal includes the set of N optical signals, and that a total power of the set of M output optical signals exceeds a predefined multiple of a total power of the seed optical signal, thereby ensuring that a majority of a power efficiency of the optical source is associated with power efficiencies of the set of K optical amplifiers instead of power efficiencies of the set of N light sources.

The set of N light sources may include distributed feedback lasers. In addition, the set of K optical amplifiers may include semiconductor optical amplifiers (SOAs). For example, the SOAs may include germanium layers evanescently coupled to the surface of the substrate.

Alternatively or additionally, the SOAs may be flip-chip bonded to the surface of the substrate. In these embodiments, the substrate may include strain layers and etch pits, where the germanium layers are located above the etch pits, thereby allowing strain layers to be deposited on both sides of the germanium layers. In this way, the germanium layers may be tensile strained. Furthermore, the substrate may include evanescent couplers that optically couple the seed optical signal to the germanium layers, and the set of M output optical signals from the germanium layers.

Additionally, the set of K optical amplifiers may include cascaded gain stages.

Note that M may be larger than N, thereby amortizing the power efficiencies of the set of N light sources across the set of M output optical waveguides. Moreover, the predefined multiple may be greater than 20.

In some embodiments, the optical source includes control logic that provides control signals to the set of N light sources and the set of K optical amplifiers, thereby specifying the predefined multiple. Alternatively or additionally, the optical source may include a polarization control mechanism optically coupled to the set of N light sources and the optical combiner and/or another polarization control mechanism optically coupled to the optical combiner and the optical fiber.

Furthermore, the substrate may include: a buried-oxide layer disposed on the substrate; and a semiconductor layer disposed on the buried-oxide layer, where the optical waveguide is defined in the semiconductor layer. In these embodiments, the substrate may include a semiconductor. As a consequence, the substrate, the buried-oxide layer and the semiconductor layer may constitute a silicon-on-insulator technology.

Another embodiment provides a system that includes the optical source. This system may (or may not) include a processor and a memory.

Another embodiment provides a method for providing a set of M output optical signals. During this method, a set of N optical signals having N carrier wavelengths is provided using the set of N light sources, where a given light source provides a given optical signal having a given carrier wavelength. Then, the set of N optical signals are optically combined into a seed optical signal and the seed optical signal is transported using the optical fiber. Moreover, the seed optical signal is optically coupled to the substrate, the seed optical signal is transported using the optical waveguide disposed on a surface of the substrate, and the seed optical signal is power amplified using the set of K optical amplifiers to provide the set of M output optical signals. Next, the set of M output optical signals is transported using the set of M output optical waveguides, where a given output optical waveguide transports a given output optical signal. Note that the given output optical signal includes the set of N optical signals, and that a total power of the set of M output optical signals exceeds a predefined multiple of a total power of the seed optical signal, thereby ensuring that a majority of a power efficiency of the optical source is associated with power efficiencies of the set of K optical amplifiers instead of power efficiencies of the set of N light sources.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
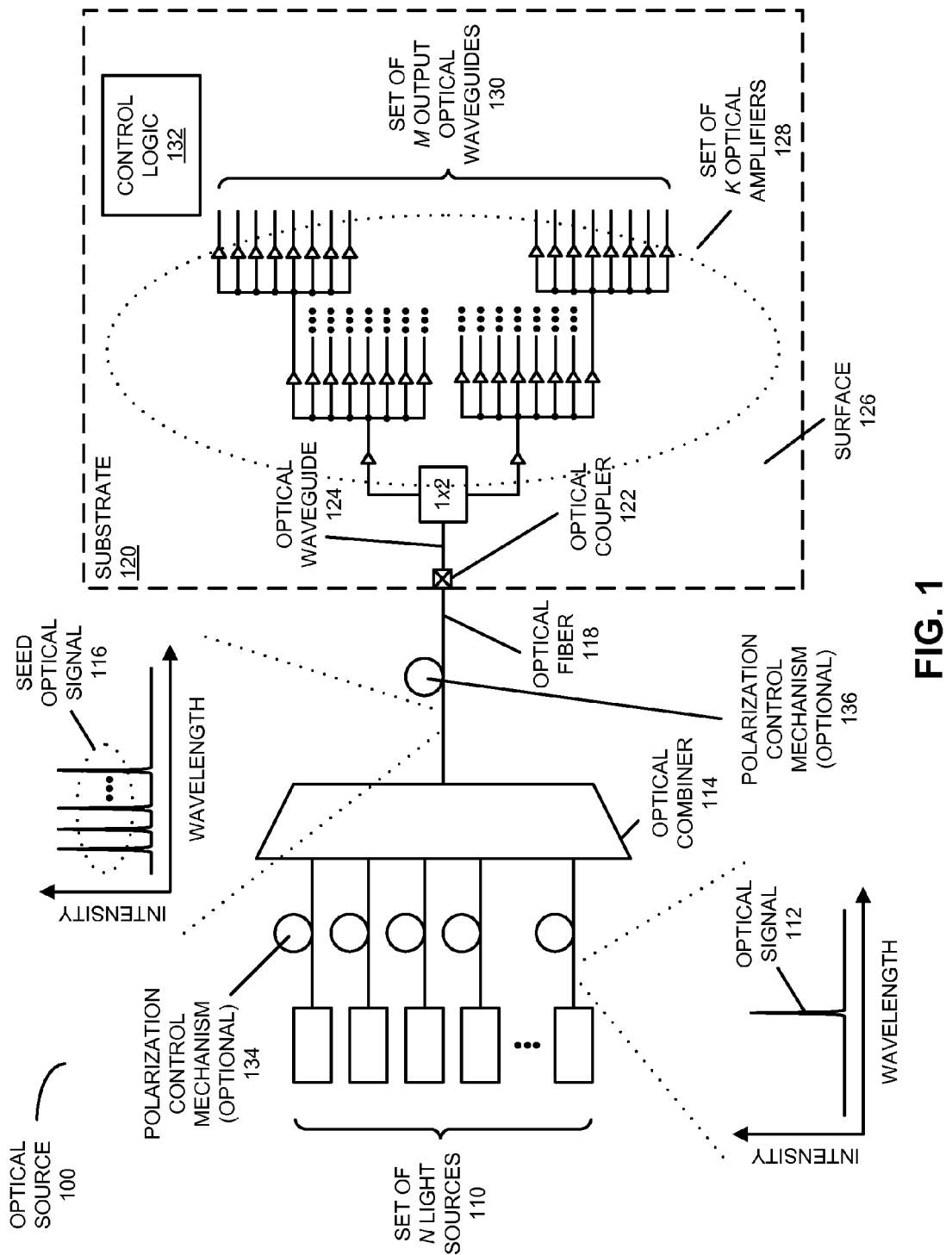
FIG. 1 is a block diagram of an optical source in accordance with an embodiment of the present disclosure.

Embodiments of an optical source, a system that includes the optical source, and a technique for providing a set of M output optical signals using the optical source are described. The optical source includes a set of N light sources that provide a corresponding set of N optical signals having N carrier wavelengths. These optical signals are combined into a seed optical signal and transported to a substrate using an optical fiber. This substrate includes a set of K optical amplifiers that amplify the seed optical signal and provide a set of M output optical signals on a corresponding set of M output optical waveguides (where M is less than K). In this way, a total power of the set of M output optical signals may be significantly larger than that of the seed optical signal, thereby ensuring that a majority of a power efficiency of the optical source is associated with power efficiencies of the set of K optical amplifiers instead of power efficiencies of the set of N light sources.

By combining external light sources with on-chip optical amplifiers (which may be easier to integrate than lasers), this optical technique may allow a compact, energy-efficient, low-cost, multi-wavelength optical source to be implemented for use in a variety of applications, such as high-speed communication in a wavelength-division-multiplexing (WDM) silicon-photonic link. Consequently, the optical source may help facilitate high-speed inter- and intra-chip silicon-photonic interconnects, as well as associated systems that can include this component (such as high-performance computing systems).

We now describe embodiments of the optical source. The electrical-to-optical conversion efficiency of a WDM optical source is a major contributor to the energy efficiency of a silicon-photonic link. For example, if a silicon-photonic link uses a minimum of 2 mW of input light (before an optical modulator), and the electrical-to-optical conversion efficiency is 10% (which is optimistic relative to the 1-5% electrical-to-optical conversion efficiency of many existing optical sources), then 20 mW of electrical power will be needed just to create the required input light (i.e., not including the power consumed by the remainder of the silicon-photonic link). This power consumption can be reduced by improving the conversion efficiency of the optical source and by decreasing the optical losses that occur when light is input to the silicon-photonic link. The latter approach is described below.

In existing silicon-photonic links, light is coupled into small optical waveguides using a variety of techniques, such as: surface coupling with grating couplers, surface coupling with tapered waveguides plus a mirror, edge coupling with tapered waveguides, coupling using inverse-tapered waveguides, evanescent coupling, etc. However, this coupling usually results in optical losses (and, thus, wasted power) of 2-3 dB.

While researchers are working on reducing such optical losses, another approach is to reduce optical losses prior to optical modulation in a silicon-photonic link (in which data is encoded onto optical signals) by reducing the number of optical couplers and by using optical amplifiers to boost the input light after optically coupling light into a chip, thereby increasing the effective wall-plug power efficiency of the silicon-photonic link. This approach can allow less intense light to be coupled into the chip (e.g., 100 µW) and then boosted on-chip. In principle, optical amplification can occur either before or after the optical modulation. Note that amplifying DC light before the optical modulation can reduce the effect of accumulated noise, while amplifying after the optical modulation can further improve the power efficiency of the overall silicon-photonic link. In the discussion that follows, optical amplification before optical modulation is used as an illustrative example.

FIG. 1 presents a block diagram of an optical source 100. This optical source includes a set of N light sources 110 (such as distributed feedback lasers) that provide a corresponding set of N optical signals (such as optical signal 112) having N carrier wavelengths (such as carrier wavelengths for use in optical channels in an optical link), where a given light source provides a given optical signal having a given carrier wavelength. Moreover, optical source 100 includes an optical combiner 114 that combines set of N optical signals into a seed optical signal 116, and an optical fiber 118 that transports seed optical signal 116.

Furthermore, a substrate 120 in optical source 100 includes: an optical coupler 122 optically coupled to optical fiber 118 (for example, an optical proximity coupler, such as an etched mirror facet or a grating coupler); an optical waveguide 124, disposed on a surface 126 of substrate 120, which transports seed optical signal 116; a set of K optical amplifiers 128 (such as semiconductor optical amplifiers or SOAs) that amplify seed optical signal 116 and provide a set of M output optical signals; and a set of M output optical waveguides 130 (where M is less than or equal to K), where a given output optical waveguide transports a given output optical signal. Note that there are usually more optical amplifiers than optical waveguides because optical amplifiers are typically not power efficient when the input optical power is low (which is the case here so that the power from the seed light sources low enough that it is not too big an overhead to amortize). Using additional optical amplifiers helps ensure that there is reasonable amount of input power to each optical amplifier in the cascaded gain stages.

Note that the given output optical signal includes set of N optical signals, and that a total power of the set of M output optical signals exceeds a predefined multiple (such as 20, 50 or 100) of a total power of seed optical signal 116, thereby ensuring that a majority of a power efficiency of optical source 100 is associated with power efficiencies of set of K optical amplifiers 128 instead of power efficiencies of set of N light sources 110. In addition, if M is larger than N, the power efficiencies of set of N light sources 110 can be amortized across set of M output optical waveguides 130.

In some embodiments, optical source 100 includes control logic 132 that provides control signals to set of N light sources 110 and set of K optical amplifiers 128, thereby specifying the predefined multiple. Alternatively or additionally, optical source 100 may include optional polarization control mechanisms (such as optional polarization control mechanism 134) optically coupled to set of N light sources 110 and optical combiner 114 and/or other optional polarization control mechanisms (such as optional polarization control mechanism 136) optically coupled to optical combiner 114 and optical fiber 118.

As shown in FIG. 1, set of K optical amplifiers 128 may include cascaded gain stages. The first stage may amplify seed optical signal 116 (such as input laser light). Then, the amplified light may be routed to one or more stage(s) that amplify and modulate the light, which is subsequently output on set of M output optical waveguides 130.

In this way, the amount of input light lost in optical couplers can be minimized and (because of the low electrical-to-optical conversion efficiency of set of N light sources 110) the overall link-power efficiency can be increased. An assumption underlying this approach is that the electrical-to-optical energy conversion efficiency of set of K optical amplifiers 128 is higher than the wall-plug electrical-to-optical conversion efficiency of set of N light sources 110. This is often the case because the optical amplifiers do not need to accurately measure and precisely tune the carrier wavelengths in a closed loop. In addition, the optical amplifiers do not need to be actively cooled in order to maintain the carrier wavelengths on a precise grid or optical comb. The optical amplifiers may simply boost the incoming carrier wavelengths (as opposed to defining or controlling the carrier wavelengths). This latter function is relegated to set of N light sources 110, which are less power efficient.

In some embodiments, filters (not shown) prior to or within set of K optical amplifiers 128 in optical source 100 are used to reduce amplified spontaneous emission (ASE) noise. In addition, using these filters, unused carrier wavelengths, which contribute to the noise, can be eliminated.

In some embodiments, an optical switch (such as a 1×2 optical switch) is optionally included before one of the early nodes in the cascaded gain stages. This switch may allow portions of the amplifier chain to be used, while selectively allowing other portions may be deactivated. In principle, such an optical switch may be included at a variety of locations in the cascaded gain stages. For example, a low-power, low-loss 1×2 optical switch (or a 1×8 optical switch) may be used, and the added insertion loss can be compensated by the following gain stages. This approach may provide power savings when the entire cascaded chain or tree does not need to be active.

In an exemplary embodiment, 1 mW of optical signal is needed for each of set of M output optical waveguides 130 (i.e., for each optical link). Set of N light sources 110 may output 100 µW in set of N optical signals with an electrical-to-optical conversion efficiency of 5%. Thus, set of N light sources 110 may consume 2 mW. Set of K optical amplifiers 128 may output 900 µW in set of M output optical signals. However, the electrical-to-optical conversion efficiency may be 20%, so set of K optical amplifiers 128 may consume 4.5 mW. Therefore, the total 6.5 mW power consumption of optical source 100 may be dominated by set of K optical amplifiers 128.

In some embodiments, set of N light sources 110 output 8 mW in set of N optical signals and set of K optical amplifiers 128 output 1 W in the set of M output optical signals. Thus the predefined multiple may be 100 or more.

In some embodiments, the optical signals in seed optical signal 116 include eight carrier wavelengths. Moreover, set of K optical amplifiers 128 may provide 30 dB of gain and may include 8-way splitting. Thus, the set of M output optical signals may each include eight carrier wavelengths, there may be 128 optical waveguides in set of M output optical waveguides 130, and there may be a total of 1024 channels in the optical links.

Figure 2:
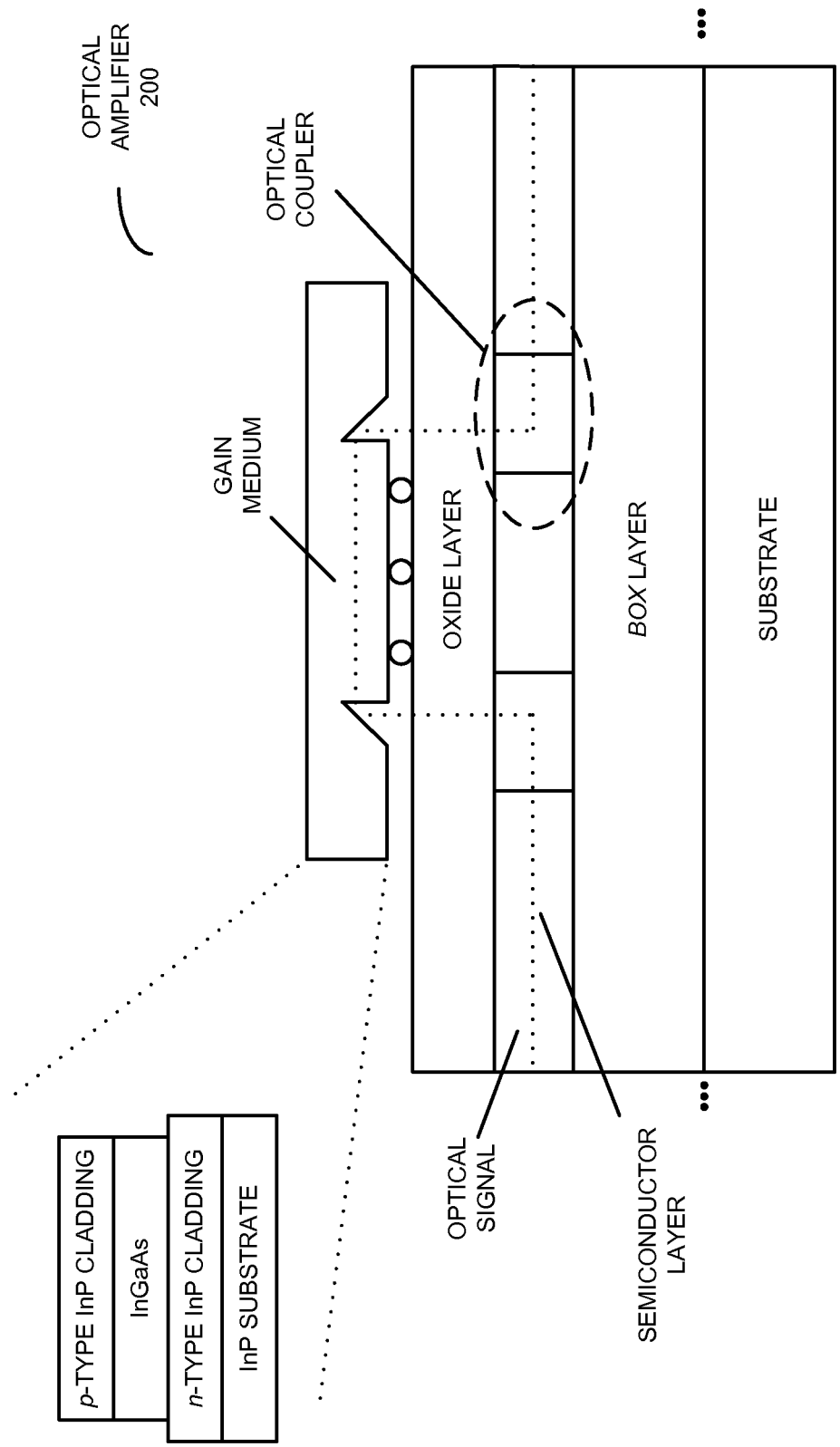
FIG. 2 is a block diagram of an optical amplifier for use in the optical source of FIG. 1 in accordance with an embodiment of the present disclosure.

Note that in embodiments where set of K optical amplifiers 128 include SOAs (which may function as broadband gain media that receive and amplify seed optical signal 116), the SOAs may be flip-chip bonded to surface 126 of substrate 120. This is shown in FIG. 2, which presents a block diagram of an optical amplifier 200 for use in optical source 100 (FIG. 1). A variety of techniques may be used to couple optical signals to and from a given SOA, such as: evanescent coupling, grating couplers, tapered couplers with mirrors, etc.

Figure 3:
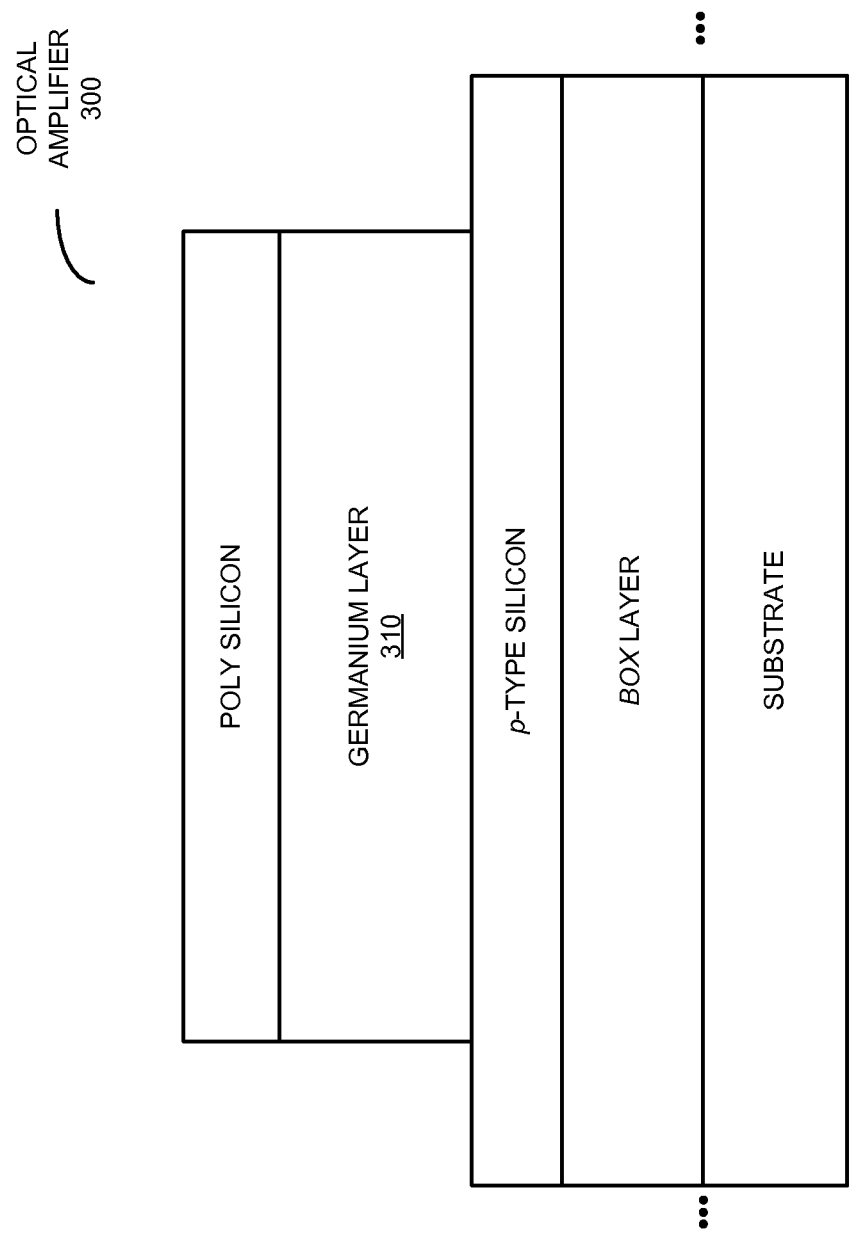
FIG. 3 is a block diagram of an optical amplifier for use in the optical source of FIG. 1 in accordance with an embodiment of the present disclosure.

As shown in FIG. 2, in general the SOAs may include a hybrid bonded III-IV semiconductor (such as indium-phosphide). However, as shown in FIG. 3, which presents a block diagram of an optical amplifier 300 for use in optical source 100 (FIG. 1), in some embodiments the given SOA includes a highly doped germanium layer 310 (for example, with a doping level of $5 \times 10^{18}$ cm$^3$) as the gain material.

Alternatively or additionally, tensile strained germanium may be transformed into a direct-bandgap semiconductor (such as is the case in group III-V semiconductors), where its radiative recombination rate is five orders of magnitude faster than those found in bulk germanium. These faster radiative rates may improve the internal gain coefficient of the gain medium in an SOA, thereby making it an effective optical amplifier. In contrast, in bulk germanium the optical bandstructure is indirect (which is a common problem in group IV semiconductors, with characteristic long radiative time constants).

Figure 4:
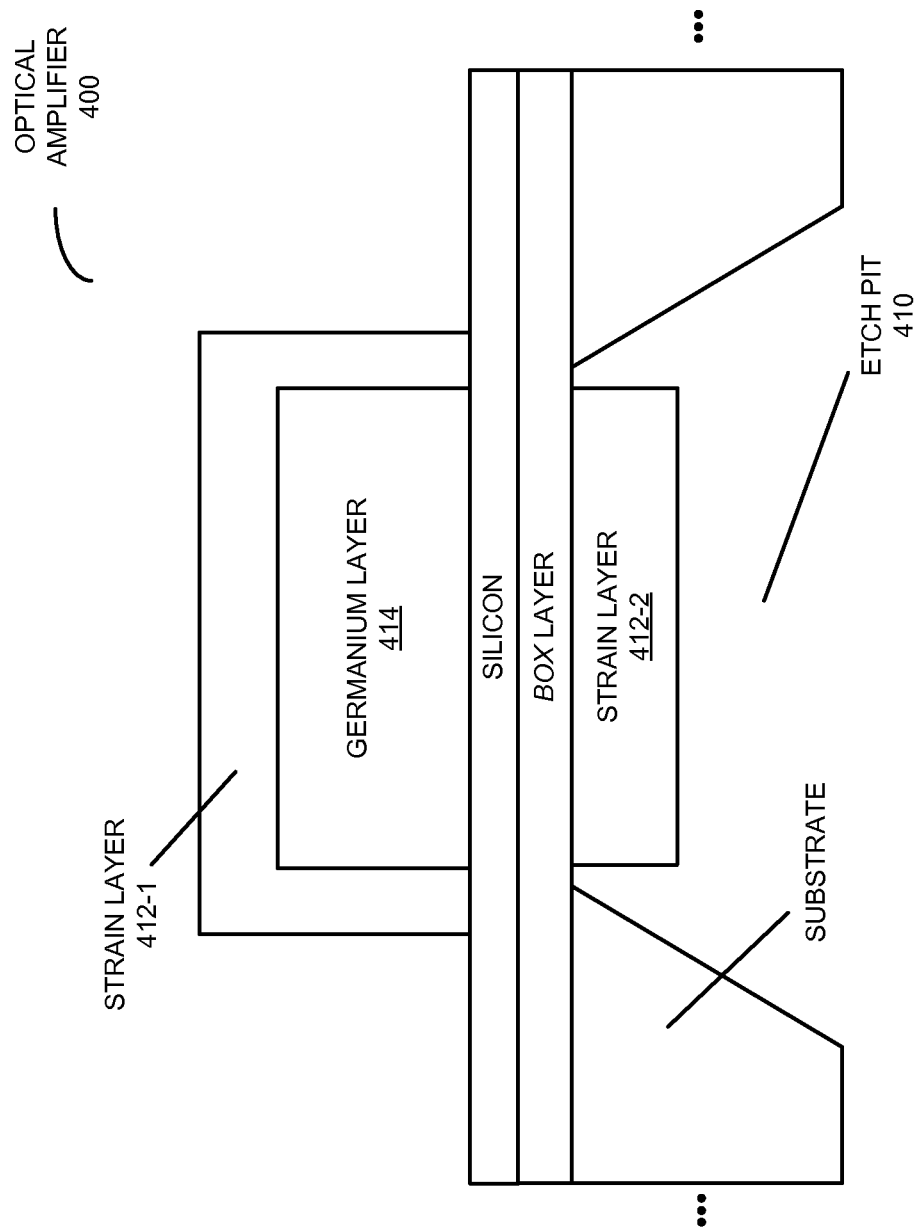
FIG. 4 is a block diagram of an optical amplifier for use in the optical source of FIG. 1 in accordance with an embodiment of the present disclosure.

The tensile strain needed to transform germanium from indirect to direct is 1.5%. This level of strain is typically too large to be produced during typical epitaxial growth conditions. Instead, as shown in FIG. 4, which presents a block diagram of an optical amplifier 400 for use in optical source 100 (FIG. 1), substrate 120 may include a backside etch pit (such as etch pit 410), strain layers 412 and germanium layer 414. By locating germanium layer 414 above etch pit 410, the reverse side of optical amplifier 400 can be accessed and material (such as strain layer 412-2) can be deposited to tensile strain (and, thus, enhance the gain) of germanium layer 414. Note that this approach can be implemented during post processing after the epitaxial growth of the germanium is completed.

In FIG. 4, a strain balanced couple may be formed by etch pit 410 and integrating compressive strain layers 412 that form a strain-couple pair. Compressive strain layers 412 may impart tensile strain to germanium layer 414 to form a neutral couple. Under equilibrium, the overall stress is balanced and under net-zero stress so that warpage of germanium layer 414 can be avoided. However, the imparted strain in this approach to any given layer may be limited by the plastic-deformation properties of the given layer. In FIG. 4, the intent is to strain germanium layer 414 as much as possible (perhaps 1%) before the onset of plastic deformation. Then, n-type doping may be used to complete the transformation of germanium into a direct bandgap semiconductor. In this way, the level of optical loss associated with impurity doping can be reduced.

Figure 5:
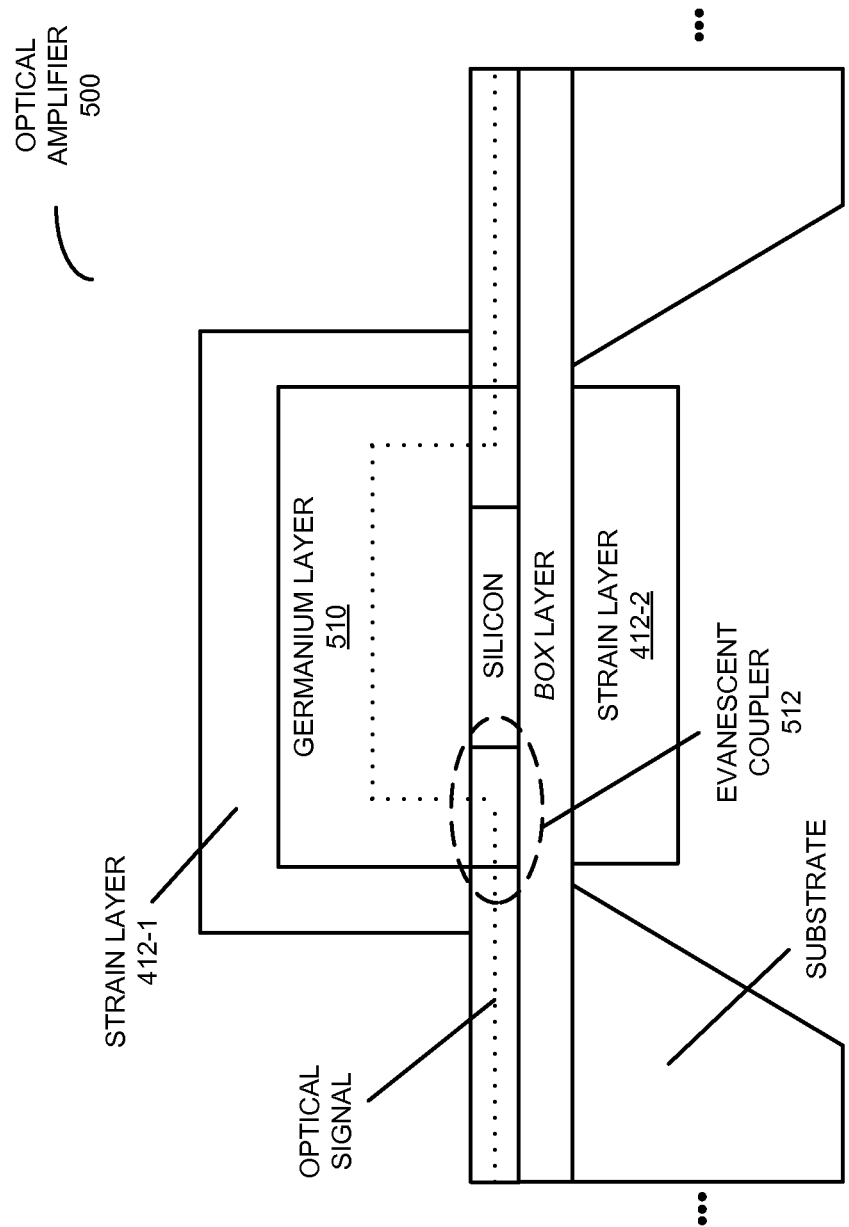
FIG. 5 is a block diagram of an optical amplifier for use in the optical source of FIG. 1 in accordance with an embodiment of the present disclosure.

Doping and/or tensile strain may be used to create an evanescently coupled SOA. This is shown in FIG. 5, which presents a block diagram of an optical amplifier 500 for use in optical source 100 (FIG. 1). In particular, germanium layer 510 may be evanescently coupled to a surface of the substrate by tapered evanescent couplers (such as evanescent coupler 512). These evanescent couplers may optically couple seed optical signal 116 (FIG. 1) to germanium layer 510, and the set of M output optical signals from germanium layer 510.

Figure 6:
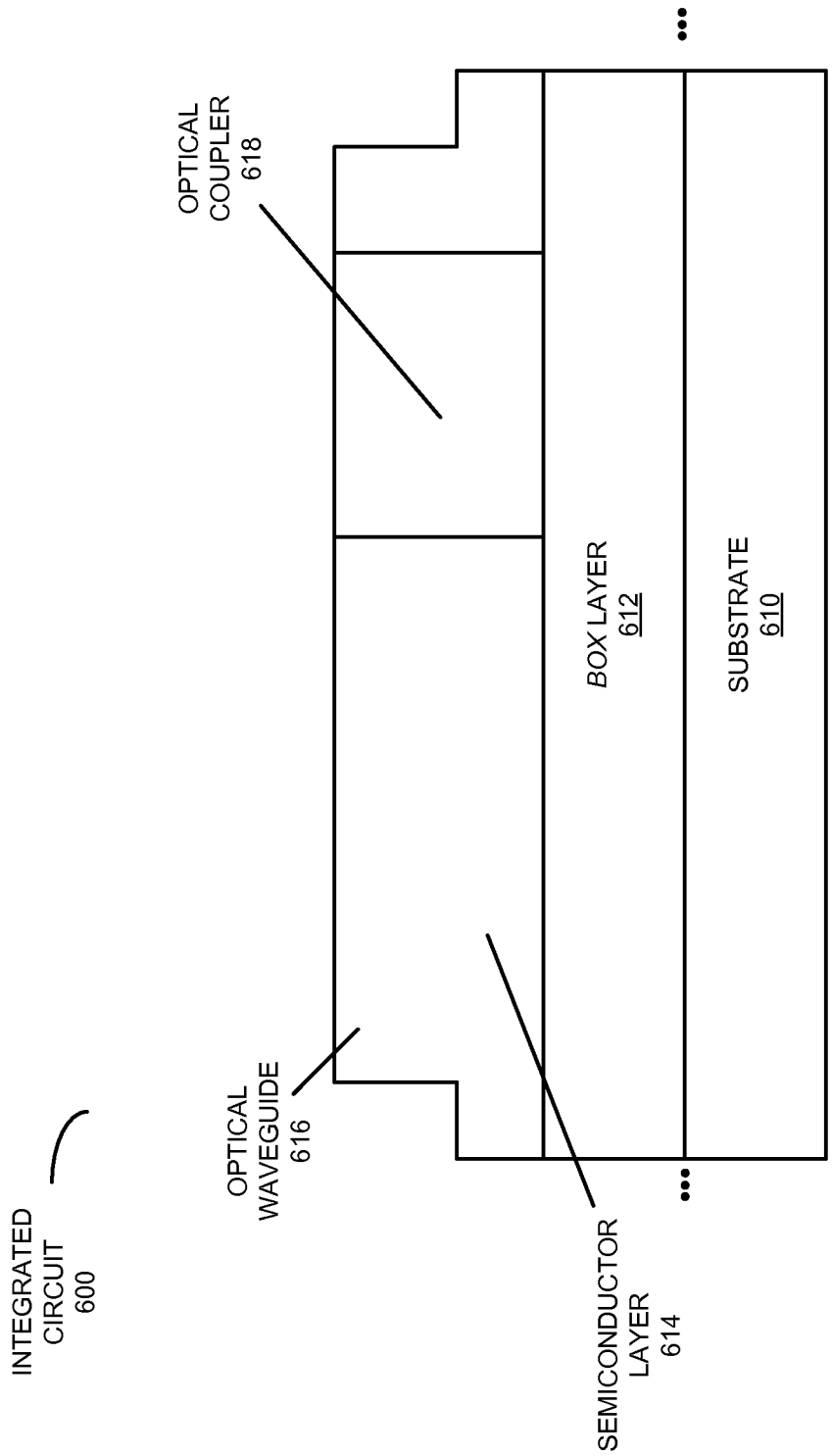
FIG. 6 is a block diagram illustrating an integrated circuit in accordance with an embodiment of the present disclosure.

In some embodiments, at least a portion of one of the preceding embodiments of the optical source is disposed on an integrated circuit. This is shown in FIG. 6, which presents a block diagram illustrating an integrated circuit 600. In this integrated circuit, one or more optical waveguides (such as optical waveguide 616) and/or additional optical components (such as optical coupler 618) may be defined in a semiconductor layer 614. Furthermore, integrated circuit 600 may include a substrate 610 and a buried-oxide (BOX) layer 612 deposited on substrate 610, where semiconductor layer 614 is disposed on BOX layer 612.

Note that substrate 610 may include silicon, BOX layer 612 may include a dielectric or an oxide (such as silicon dioxide), and/or semiconductor layer 614 may include silicon (thus, optical waveguide 616 may include a silicon optical waveguide). Therefore, substrate 610, BOX layer 612 and semiconductor layer 614 may constitute a silicon-on-insulator (SOI) technology. In some embodiments, the silicon in semiconductor layer 614 is 0.5 µm thick, and the silicon-dioxide layer may have a thickness between 0.1 and 10 µm.

In some embodiments, such as FIG. 6, the light is confined in semiconductor layer 614 and may be surrounded on all sides (including below) by an oxide. However, in other embodiments an optical component may be fabricated using a different confinement, such as a polymer ring deposited on an oxide, or poly-silicon surrounded by an oxide (in which case BOX layer 612 may not be needed).

Figure 7:
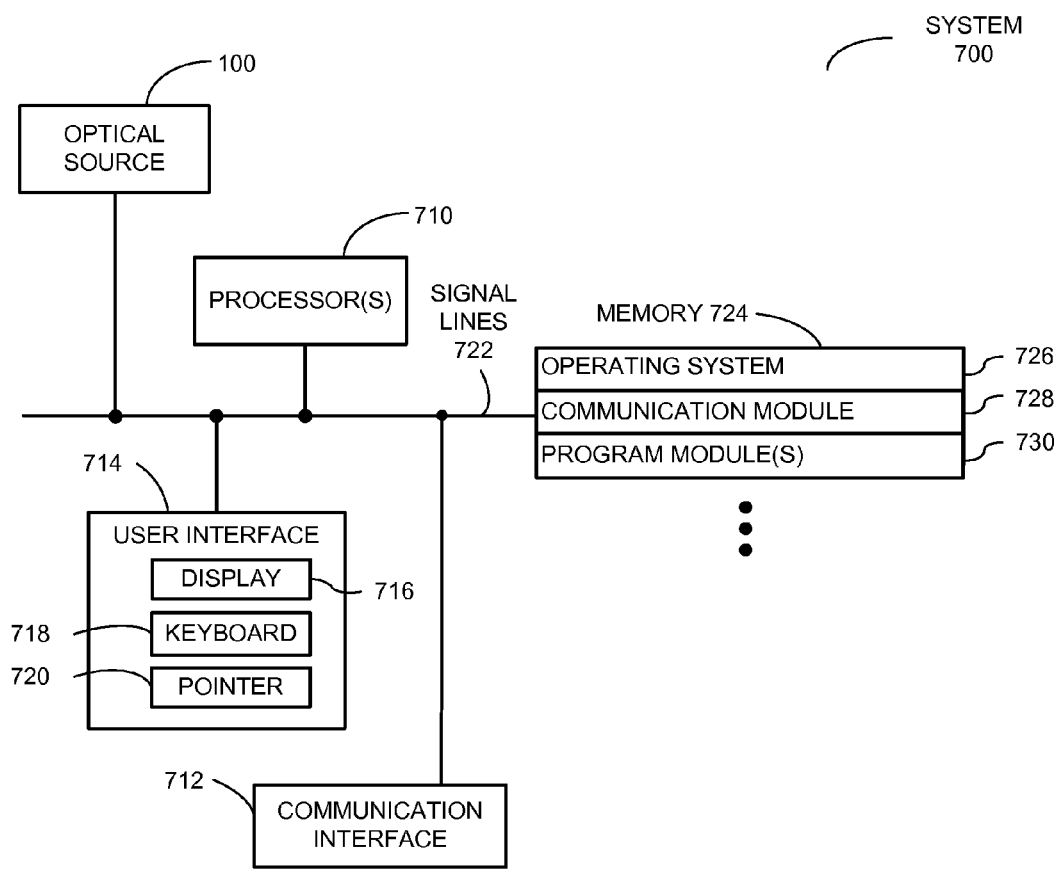
FIG. 7 is a block diagram illustrating a system that includes the optical source of FIG. 1 in accordance with an embodiment of the present disclosure.

One or more of the preceding embodiments of the optical source may be included in a system and/or an electronic device. This is shown in FIG. 7, which presents a block diagram illustrating a system 700 that includes optical source 100 (FIG. 1). System 500 may include: one or more processors 510, a communication interface 512 and a user interface 514, which may be coupled to other components in system 500 by one or more signal lines 522. Note that the one or more processors (or processor cores) 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in system 500 may include volatile memory and/or non-volatile memory. More specifically, memory 524 may include: ROM, RAM, EPROM, EEPROM, flash, one or more smart cards, one or more magnetic disc storage devices, and/or one or more optical storage devices. Memory 524 may store an operating system 526 that includes procedures (or a set of instructions) for handling various basic system services for performing hardware-dependent tasks. Moreover, memory 524 may also store communications procedures (or a set of instructions) in a communication module 528. These communication procedures may be used for communicating with one or more computers, devices and/or servers, including computers, devices and/or servers that are remotely located with respect to the system 500.

Memory 524 may also include one or more program modules 530 (or a set of instructions). Note that one or more of program modules 530 may constitute a computer-program mechanism. Instructions in the various modules in the memory 524 may be implemented in: a high-level procedural language, an object-oriented programming language, and/or in an assembly or machine language. The programming language may be compiled or interpreted, i.e., configurable or configured, to be executed by the one or more processors (or processor cores) 510.

System 500 may include: a VLSI circuit, a switch, a hub, a bridge, a router, a communication system (such as WDM), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet, a supercomputer, a network-attached-storage (NAS) system, a storage-area-network (SAN) system, and/or another electronic computing device.

In general, system 500 may be at one location or may be distributed over multiple, geographically dispersed locations. Moreover, some or all of the functionality of system 500 may be implemented in one or more application-specific integrated circuits (ASICs) and/or one or more digital signal processors (DSPs). Furthermore, functionality in the preceding embodiments may be implemented more in hardware and less in software, or less in hardware and more in software, as is known in the art.

The preceding embodiments may include fewer components or additional components. For example, in FIG. 6 semiconductor layer 614 may include poly-silicon or amorphous silicon and/or substrate 610 may include multiple substrates in a multi-chip module (such as a multi-chip module in which alternating facing chips that include routing and bridge layers are coupled using optical proximity communication). Furthermore, a wide variety of fabrication techniques may be used to fabricate the optical source in the preceding embodiments, as is known to one of skill in the art. In addition, a wide variety of optical components may be used in or in conjunction with the optical source.

Furthermore, while distributed feedback lasers and SOAs were used as an illustration in the preceding embodiments, in other embodiments a wide variety of gain elements, lasers and light sources may be used, including: a semiconductor laser, a Fabry-Perot laser, a laser that receives and outputs light from the same facet, etc.

Although these embodiments are illustrated as having a number of discrete items, the embodiments of the optical source, the optical amplifier, the integrated circuit and the system are intended to be functional descriptions of the various features that may be present rather than structural schematics of the embodiments described herein. Consequently, in these embodiments two or more components may be combined into a single component, and/or a position of one or more components may be changed.

Figure 8:
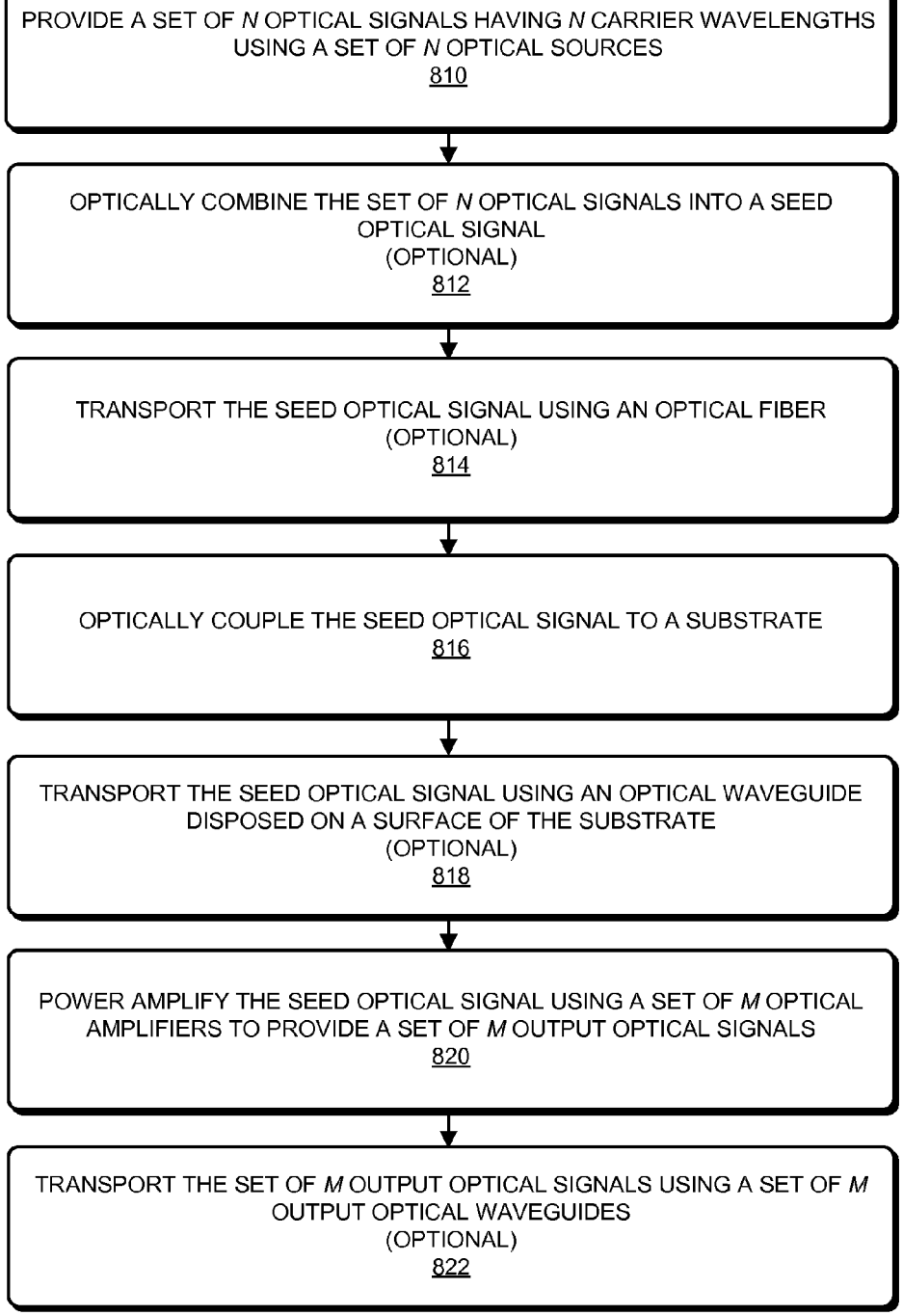
FIG. 8 is a flow chart illustrating a method for providing a set of M output optical signals in accordance with an embodiment of the present disclosure.

We now describe embodiments of the method. FIG. 8 presents a flow chart illustrating a method 800 for providing a set of M output optical signals, which may be performed by optical source 100 (FIG. 1). During this method, a set of N optical signals having N carrier wavelengths is provided using a set of N light sources (operation 810), where a given light source provides a given optical signal having a given carrier wavelength. Then, the set of N optical signals are optionally optically combined into a seed optical signal (operation 812) and the seed optical signal is optionally transported using an optical fiber (operation 814). Moreover, the seed optical signal is optically coupled to a substrate (operation 816), the seed optical signal is optionally transported using an optical waveguide disposed on a surface of the substrate (operation 818), and the seed optical signal is power amplified using a set of K optical amplifiers to provide the set of M output optical signals (operation 820). Next, the set of M output optical signals is optionally transported using a set of M output optical waveguides (operation 822), where a given output optical waveguide transports a given output optical signal.

Note that the given output optical signal includes the set of N optical signals, and that a total power of the set of M output optical signals exceeds a predefined multiple of a total power of the seed optical signal, thereby ensuring that a majority of a power efficiency of the optical source is associated with power efficiencies of the set of K optical amplifiers instead of power efficiencies of the set of N light sources.

In some embodiments of method 800, there may be additional or fewer operations. Moreover, the order of the operations may be changed, and/or two or more operations may be combined into a single operation.

While the preceding embodiments illustrate the use of the optical source in conjunction with an optical link, the optical source may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical source, comprising:
   a set of N light sources configured to provide a corresponding set of N optical signals having N different carrier wavelengths, wherein a given light source is configured to provide a given optical signal having a given carrier wavelength;
   an optical combiner, optically coupled to the set of N light sources, configured to combine the set of N optical signals into a seed optical signal; and
   a substrate, wherein the substrate includes:
      an optical coupler configured to receive the seed optical signal that includes the set of N optical signals;
      a set of K optical amplifiers optically coupled to the optical coupler, wherein the set of K optical amplifiers is configured to amplify the set of N optical signals and to provide a set of M output optical signals;
   wherein the given output optical signal includes the set of N optical signals;
   wherein M is less than K; and
   wherein a total power of the set of M output optical signals exceeds a predefined multiple of a total power of the set of N optical signals.

2. The optical source of claim 1, further comprising:
   an optical fiber, optically coupled to the optical combiner, configured to transport the seed optical signal, wherein the optical coupler is configured to receive the seed optical signal that includes the set of N optical signals; and
   wherein the substrate includes:
      an optical waveguide, optically coupled to the optical coupler, configured to transport the seed optical signal, wherein the optical waveguide is disposed on a surface of the substrate; and
      a set of M output optical waveguides optically coupled to the set of K optical amplifiers, wherein a given output optical waveguide is configured to transport a given output optical signal.

3. The optical source of claim 1, wherein the set of N light sources include distributed feedback lasers.

4. The optical source of claim 1, wherein the set of K optical amplifiers include semiconductor optical amplifiers (SOAs).

5. The optical source of claim 4, wherein the SOAs are flip-chip bonded to the surface of the substrate.

6. The optical source of claim 4, wherein the SOAs include germanium layers evanescently coupled to the surface of the substrate.

7. The optical source of claim 6, wherein the substrate includes strain layers and etch pits; and
   wherein the germanium layers are located above the etch pits, thereby allowing strain layers to be deposited on both sides of the germanium layers.

8. The optical source of claim 6, wherein the substrate further includes evanescent couplers configured to optically couple the seed optical signal to the germanium layers and the set of M output optical signals from the germanium layers.

9. The optical source of claim 1, further comprising a set of M output optical waveguides optically coupled to the set of K optical amplifiers, wherein a given output optical waveguide is configured to transport a given output optical signal, wherein M is larger than N, thereby amortizing the power efficiencies of the set of N light sources across the set of M output optical waveguides.

10. The optical source of claim 1, further comprising control logic configured to provide control signals to the set of N light sources and the set of K optical amplifiers, thereby specifying the predefined multiple.

11. The optical source of claim 10, wherein the predefined multiple is greater than 20.

12. The optical source of claim 1, wherein the set of K optical amplifiers include cascaded gain stages.

13. The optical source of claim 1, further comprising a polarization control mechanism optically coupled to the set of N light sources and the optical combiner.

14. The optical source of claim 1, wherein the substrate further includes:
   a buried-oxide layer disposed on the substrate; and
   a semiconductor layer disposed on the buried-oxide layer, wherein the optical waveguide is defined in the semiconductor layer.

15. The optical source of claim 14, wherein the substrate includes a semiconductor.

16. The optical source of claim 14, wherein the substrate, the buried-oxide layer and the semiconductor layer constitute a silicon-on-insulator technology.

17. A system, comprising:

a processor;

a memory storing a program module that is configured to be executed by the processor; and an optical source, wherein the optical source comprises:

a set of N light sources configured to provide a corresponding set of N optical signals having N different carrier wavelengths, wherein a given light source is configured to provide a given optical signal having a given carrier wavelength;

an optical combiner, optically coupled to the set of N light sources, configured to combine the set of N optical signals into a seed optical signal; and a substrate, wherein the substrate includes:

an optical coupler configured to receive the seed optical signal that includes the set of N optical signals;

a set of K optical amplifiers optically coupled to the optical coupler, wherein the set of K optical amplifiers is configured to amplify the set of N optical signals and to provide a set of M output optical signals;

wherein the given output optical signal includes the set of N optical signals;

wherein M is less than K; and wherein a total power of the set of M output optical signals exceeds a predefined multiple of a total power of the set of N optical signals.

18. A method for providing a set of M output optical signals, the method comprising:

providing a set of N optical signals having N different carrier wavelengths using a set of N light sources, wherein a given light source provides a given optical signal having a given carrier wavelength;

combining the set of N optical signals into a seed optical signal;

optically coupling the seed optical signal that includes the set of N optical signals to a substrate; and amplifying the set of N optical signals using a set of K optical amplifiers to provide the set of M output optical signals, wherein M is less than K;

wherein the given output optical signal includes the set of N optical signals; and wherein a total power of the set of M output optical signals exceeds a predefined multiple of a total power of the set of N optical signals.

19. The method of claim 18, wherein the set of N light sources include distributed feedback lasers.

20. The method of claim 18, wherein the method further comprises transporting the set of M output optical signals using a set of M output optical waveguides, wherein a given output optical waveguide is configured to transport a given output optical signal; and wherein M is larger than N, thereby amortizing the power efficiencies of the set of N light sources across the set of M output optical waveguides.

* * * * *